(12) United States Patent
Challener et al.

(10) Patent No.: US 7,281,125 B2
(45) Date of Patent: Oct. 9, 2007

(54) SECURING SENSITIVE CONFIGURATION DATA REMOTELY

(75) Inventors: David Carroll Challener, Raleigh, NC (US); Steven Dale Goodman, Raleigh, NC (US); David Robert Safford, Brewster, NY (US); Randall Scott Springfield, Chapel Hill, NC (US)

(73) Assignee: Lenovo (Singapore) Pte. Ltd., New Tech Park, Singapore (SG)

( * ) Notice: Subject to any disclaimer, the term of this patent is extended or adjusted under 35 U.S.C. 154(b) by 1059 days.

(21) Appl. No.: 09/940,155

(22) Filed: Aug. 24, 2001

(65) Prior Publication Data

US 2003/0041254 A1 Feb. 27, 2003

(51) Int. Cl.
*H04L 29/00* (2006.01)

(52) U.S. Cl. .......................... 713/2; 713/164; 713/165; 713/194; 380/259

(58) Field of Classification Search .................. 726/26, 726/18; 713/2, 164–165, 194; 380/259
See application file for complete search history.

(56) References Cited

U.S. PATENT DOCUMENTS

| | | | |
|---|---|---|---|
| 5,142,578 A | 8/1992 | Matyas et al. ................. 380/21 |
| 5,164,988 A | 11/1992 | Matyas et al. ................. 380/25 |
| 5,421,006 A | 5/1995 | Jablon et al. ................. 395/575 |
| 5,525,730 A * | 6/1996 | Choi et al. ................... 544/320 |
| 5,579,522 A * | 11/1996 | Christeson et al. ............. 713/2 |
| 5,742,758 A * | 4/1998 | Dunham et al. ............... 726/18 |
| 5,956,408 A | 9/1999 | Arnold ........................ 380/49 |
| 5,958,051 A | 9/1999 | Renaud et al. ............... 713/200 |
| 5,982,899 A | 11/1999 | Probst ......................... 380/25 |
| 6,021,491 A | 2/2000 | Renaud ....................... 713/179 |
| 6,138,236 A * | 10/2000 | Mirov et al. .................. 726/26 |
| 6,148,387 A | 11/2000 | Galasso et al. .............. 711/203 |
| 6,185,685 B1 | 2/2001 | Morgan et al. ............... 713/183 |
| 6,360,322 B1 * | 3/2002 | Grawrock .................... 713/176 |

(Continued)

FOREIGN PATENT DOCUMENTS

WO  WO 00/49717  8/2000

OTHER PUBLICATIONS

Copending U.S. Appl. No. 10/749,584.*

(Continued)

*Primary Examiner*—Kambiz Zand
*Assistant Examiner*—Tongoc Tran
(74) *Attorney, Agent, or Firm*—Winstead PC

(57) ABSTRACT

A method, computer program product and computer system for securing alterable data. A computer that is remotely managed may be equipped with a protected storage that is accessible only by BIOS code. The protected storage may have the capacity to store a symmetrical encryption key. An EEPROM, which normally contains the BIOS code, may be used to store accessible configuration data as well as remotely unaccessible sensitive access information (e.g., passwords). The remotely unaccessible sensitive data is encrypted with the symmetrical encryption key by the BIOS code. Remote access to the sensitive data is accomplished via change requests submitted to the BIOS code over a secure channel. The BIOS code then determines whether the request is valid. If so, then sensitive data is decrypted, altered, encrypted, and re-written into the EEPROM. Normal access to accessible data is unaffected and remote access is allowed without changing the computer system architecture.

12 Claims, 6 Drawing Sheets

U.S. PATENT DOCUMENTS

| | | | |
|---|---|---|---|
| 6,647,498 B1 * | 11/2003 | Cho | 726/17 |
| 6,654,820 B1 * | 11/2003 | Ishibashi et al. | 710/34 |
| 6,725,382 B1 * | 4/2004 | Thompson et al. | 726/19 |
| 6,775,778 B1 * | 8/2004 | Laczko et al. | 713/194 |
| 6,791,572 B1 * | 9/2004 | Cloney et al. | 345/619 |
| 6,925,570 B2 * | 8/2005 | Freeman et al. | 713/192 |
| 6,978,385 B1 * | 12/2005 | Cheston et al. | 340/5.85 |
| 2003/0028765 A1 * | 2/2003 | Cromer et al. | 713/164 |

OTHER PUBLICATIONS

Copending U.S. Appl. No. 10/994,620.*
Copending U.S. Appl. No. 10/734,960.*
Copending U.S. Appl. No. 10/749,584, filed Dec. 31, 2003.*
Copending U.S. Appl. No. 10/994,620, filed Nov. 23, 2004.*
Copending U.S. Appl. No. 10/734,960, filed Dec. 12, 2003.*

* cited by examiner

SECURING SENSITIVE CONFIGURATION DATA REMOTELY

TECHNICAL FIELD

The present invention is related in general to securing sensitive information and in particular to securing sensitive information in remotely managed personal computer (PC) systems.

BACKGROUND INFORMATION

PC configuration data, such as boot-up sequences, passwords, access rights, etc., must be protected in order to ensure the authenticity of the user and the Boot source. Some of this data (e.g., Boot sequences and access rights) maybe viewed by anyone, but this data must be protected from overt or inadvertent change. Other data (e.g., passwords) must be completely hidden. The usual method of protecting system configuration and security data is to hide all of it in a protected non-volatile random access memory (NVRAM). During Power-On-Self-Test (POST), system configuration and access data are used to verify the identity of the user and to determine the appropriate access rights and Boot devices. POST is a series of built-in diagnostics performed by the BIOS in a PC when the computer is first started or powered up. Just before boot, POST locks the system configuration and access data in a NVRAM device. While this provides adequate security of the access data, it makes it difficult to remotely change the system configuration data.

There is, therefore, a need for a method to protect the system configuration and access data from unauthorized users, yet provide for a method of easily changing the system configuration via an authorized runtime management agent.

SUMMARY OF THE INVENTION

A protected storage is provided that is accessible only by the BIOS code. The protected storage is used to store a previously generated symmetrical encryption Key. Normal remote accessible data is stored in an EEPROM with existing write protection algorithms. The unaccessible data is encrypted with the Key and stored in the EEPROM along with the non-encrypted accessible data. To alter the normal accessible data, a write request is issued to the BIOS to alter the normal accessible data. To alter the normal unaccessible data, a change request is issued to the BIOS over a secure channel. The BIOS validates the request before altering the data. If the request is validated, the BIOS retrieves the Key from the protected storage and decrypts the unaccessible data and executes the data alteration per the change request. The altered data is then encrypted and stored back in the EEPROM. In another embodiment where additional security is desired, configuration block data is hashed and then the Hash is encrypted and stored in the EEPROM along with configuration data. When configuration data is requested, the BIOS hashes the current configuration data and compares the Hash value to the decrypted Hash value stored in the EEPROM. If the two Hash values compare, boot-up proceeds as normal. If the Hash values do not compare, a tampering notification is issued and a recovery process is initiated. Protected storage has to have capacity for only the symmetrical encryption Key and therefore protected storage capacity is independent of the amount of unaccessible data that is to be stored.

This invention describes a way of providing reasonable protection for the configuration data and allowing authorized changes during runtime. An additional advantage is that the size of the protected storage required by this approach is independent of the amount of data that is protected.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
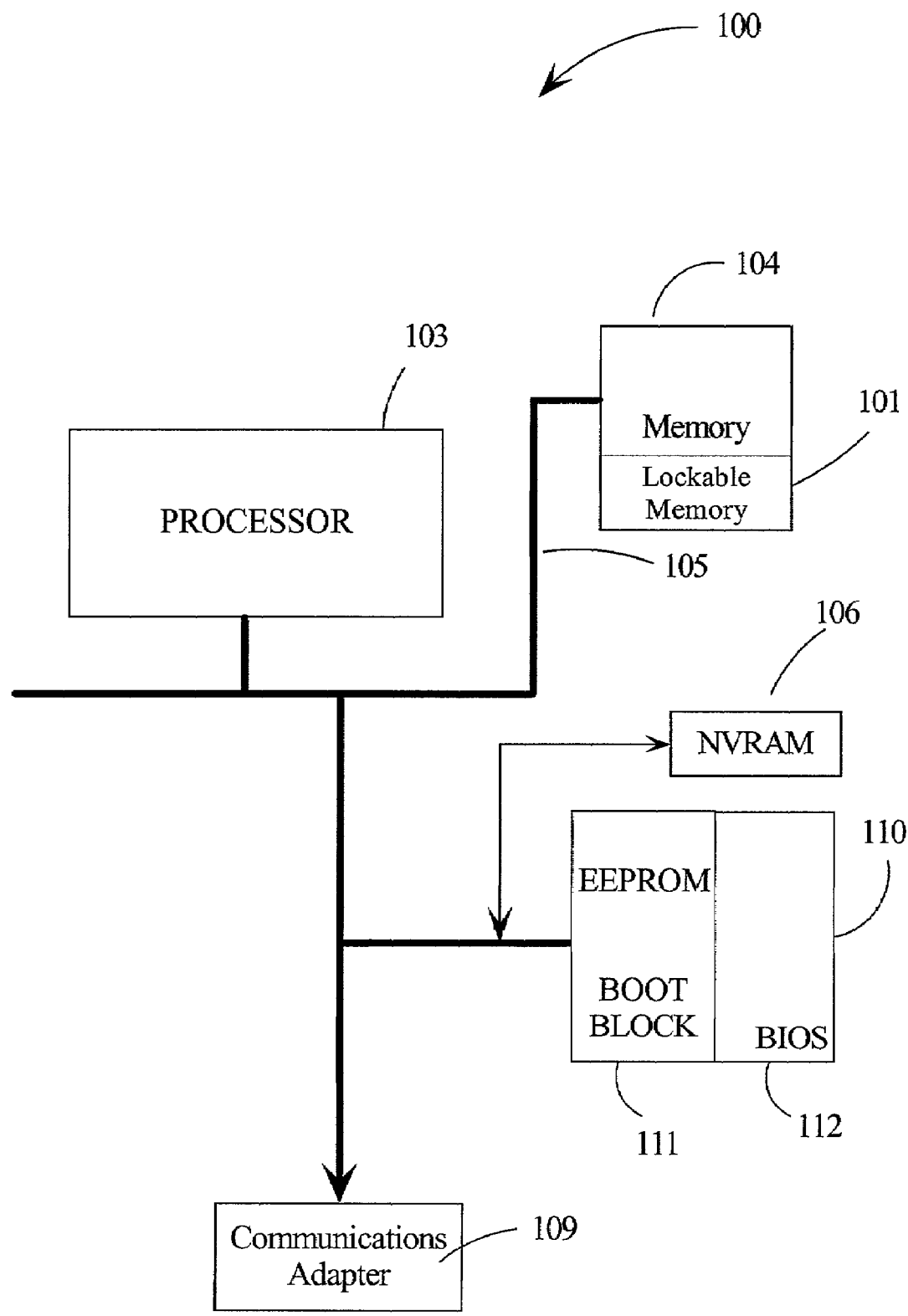
FIG. 1 is a block diagram of some circuits according to embodiments of the present invention.

In the following description, numerous specific details are set forth to provide a thorough understanding of the present invention. However, it will be obvious to those skilled in the art that the present invention maybe practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

The Basic Input Output System (BIOS) code is an essential set of routines in a personal computer (PC) or other computer system which is stored within the computer system and provides an interface between the operating system and the hardware. The BIOS code supports all peripheral technologies and internal services such as the realtime clock (time and date). On startup, the BIOS tests the system and prepares the computer for operation by querying its own small memory bank for peripheral drive and other configuration settings. It searches for other BIOS's on the plug-in boards and sets up pointers (interrupt vectors) in memory to access those routines. It then loads the operating system and passes control to it. The BIOS accepts requests from the peripheral drivers as well as the application programs. BIOS's must periodically be updated to keep pace with new peripheral technologies. If the BIOS is stored in a read-only memory (ROM) chip (ROM BIOS), then to update the BIOS the ROM chip must be replaced. In newer systems, BIOS data is stored on a flash memory chip that can be upgraded via software.

A part of the BIOS that has enough information to do validity checks on some system elements and enable the loading of additional BIOS information is sometimes called the "Boot block" code. The Boot block would normally be a protected portion of the BIOS storage device (e.g., EEPROM) which may not be erasable or rewritten. This Boot block code would have sufficient functionality to determine if essential features of the system were at a desired level and to take action to correct deficiencies.

FIG. 1 is a block diagram of system 100 used in embodiments of the present invention. A processor 103 is shown connected to memory 104, EEPROM 110, communications adaptor 109 and non-volatile random access memory (NVRAM) 106 via bus 105. NVRAM 106 is accessible only through BIOS 112 code and is specified as protected storage. Memory 104 may also have a protected memory portion 101. EEPROM 110 has BIOS 112 code as well as read only Boot Block 111 code. In embodiments of the present invention, BIOS 112 code may store a symmetrical encryption Key used to encrypt and decrypt sensitive data that is not normally remotely accessible via communication adapter 109. If system 100 is part of a remotely managed PC system, there may be times when it is desirable to alter remotely sensitive data that is normally unaccessible during runtime. A special system could be developed to allow remote alteration of sensitive data (e.g., passwords and access information), but this would make various systems non-standard. It would be preferable to configure system 100 so that only BIOS data code need be configured in a way that would allow secure data to be accessed remotely while providing adequate protection from outside tampering with sensitive data. NVRAM 106 is protected storage accessible by BIOS 112 code and could be used to store sensitive information with the assurance that the data is protected. However, not all systems have NVRAM 106 and its size, when available, would have to be such that it could handle a variable amount of sensitive data. Likewise, a portion of memory 104 could be configured as protected memory 101. Embodiments of the present invention modify the BIOS 112 code to include encryption and decryption routines with the use of a symmetrical encryption Key (the same Key is used to encrypt and to decrypt). If the sensitive data is stored in EEPROM as encrypted data and the normal remotely accessible data is stored as non-encrypted data, then protected storage need only be provided for the symmetrical encryption Key. This greatly reduces the amount of protected storage required and makes it independent of the amount of sensitive data present in system 100.

Figure 2:
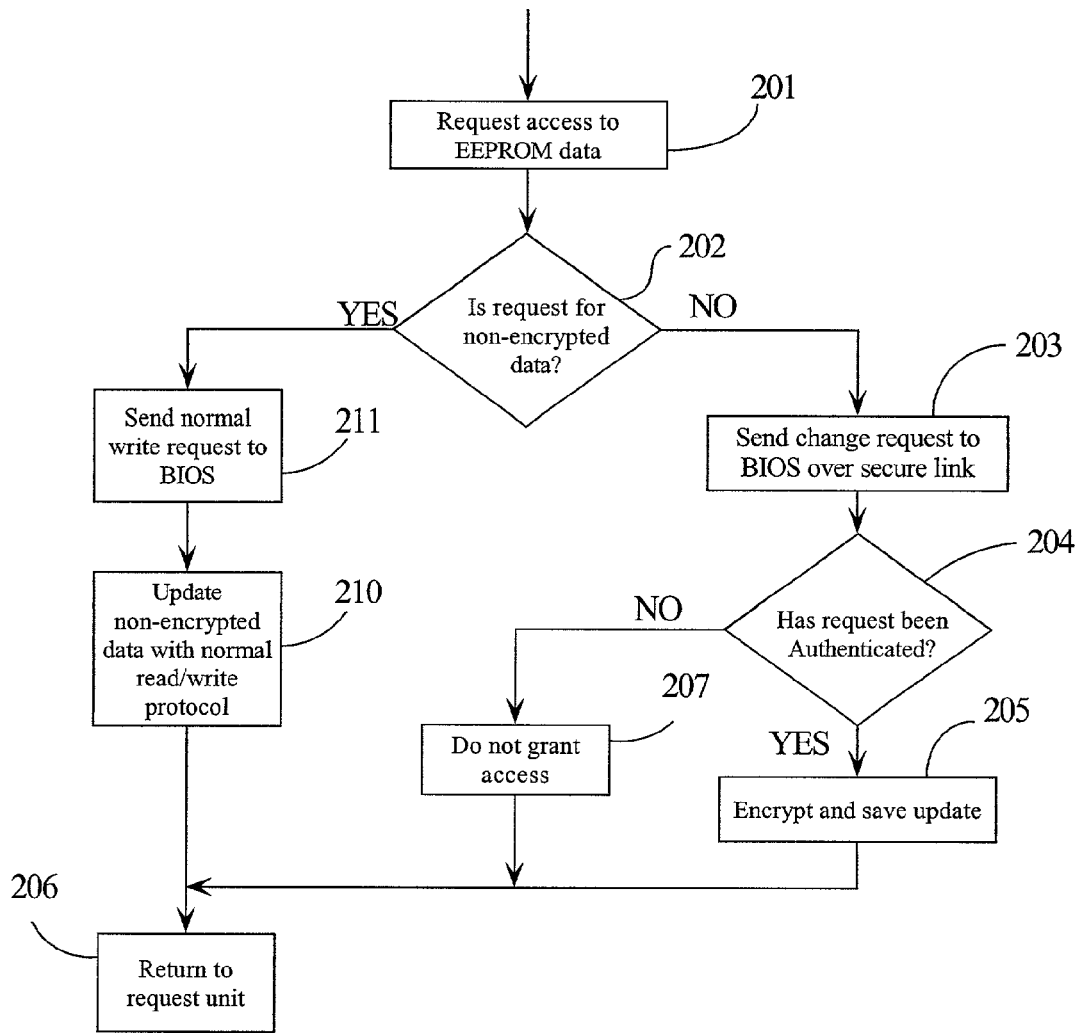
FIG. 2 a flow diagram of method steps used in embodiments of the present invention.

FIG. 2 is a flow diagram of method steps used in embodiments of the present invention. In step 201, a request is received in the BIOS 112 for data in EEPROM 110. In step 202, a test is done to determine if the request is for non-encrypted data. If the result of the test in step 202 is YES, then in step 211 a normal write request is sent to BIOS 112. In step 210, the non-encrypted data is altered per the write request and with normal write protocol. In step 206, a return is taken to wait for a next request. If the result of the test in step 202 is NO, then in step 203 a change request is sent to the BIOS 112 over a secure link. In step 204, routines in the BIOS 112 test the change request to determine if it can be validated. If the result of the test in step 204 is YES, then in step 205 the requested data is decrypted, altered and then encrypted and stored in EEPROM 110. In step 206, a return is executed awaiting a next request. If the result of the test in step 204 is NO, then in step 207 access to the sensitive data in EEPROM 110 is denied and the sensitive data remains unaltered.

Figure 4:
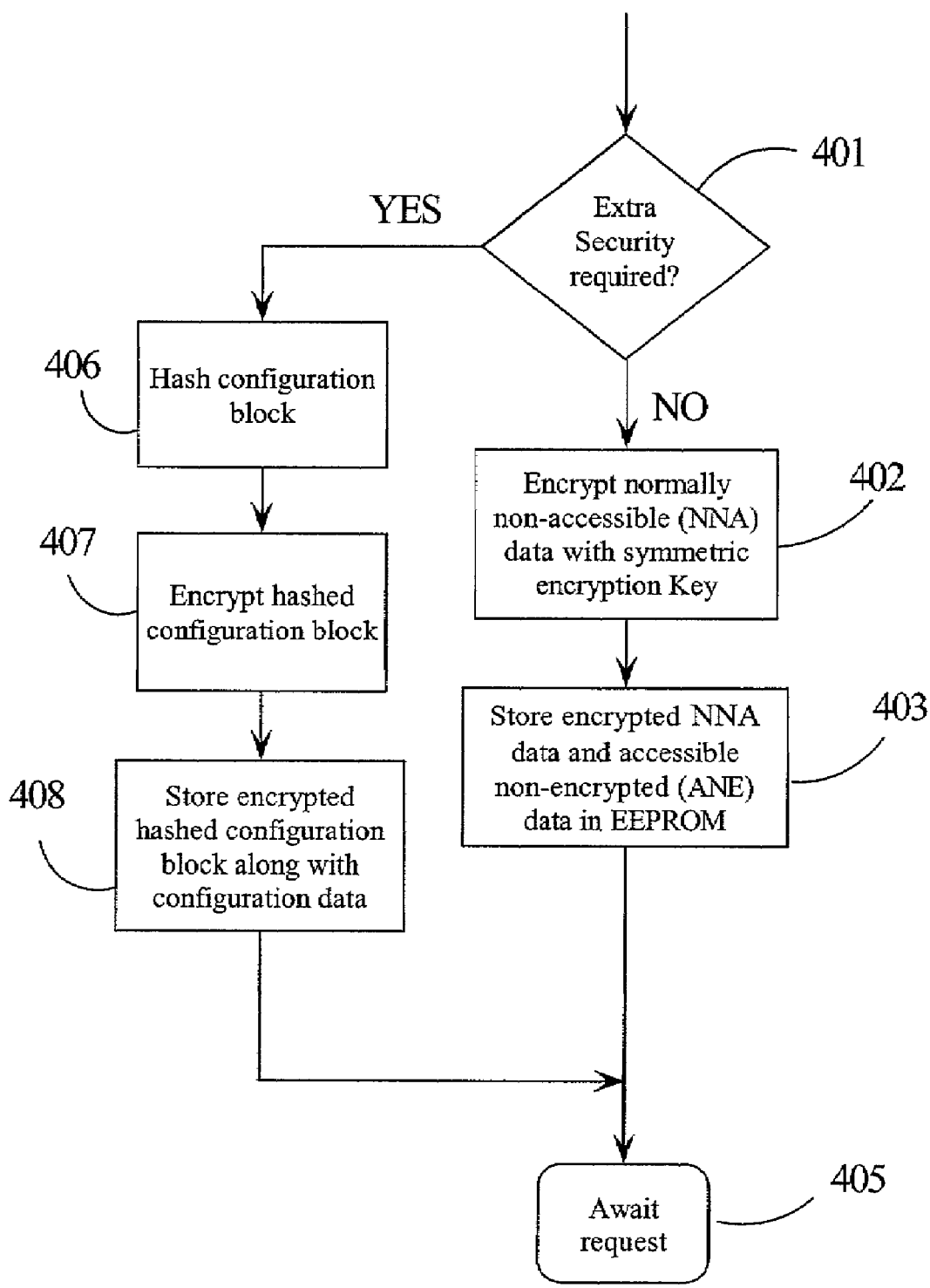
FIG. 4 is a flow diagram of method steps employed in an embodiment of the present invention.

FIG. 4 is a flow diagram of method steps in embodiments of the present invention where extra security is desired. In step 401, a test is done to determine if extra security has been requested for the system 100. If the result of the test in step 401 is YES, then in step 406 a Hash value for the configuration block is generated. Hashing takes the configuration block data and generates a unique Hash value. The Hash value is then encrypted using the symmetrical encryption Key in step 407, and in step 408 the encrypted Hash value along with the actual configuration data is stored in EEPROM 110. If the result of the test in step 401 is NO, then in step 402, the normally unaccessible (NA) data is encrypted with the symmetrical encryption Key. In step 403, the encrypted NA data and the accessible non-encrypted (ANE) data are stored in the EEPROM 110. In step 405, a wait is executed for a request to EEPROM stored data.

Figure 5:
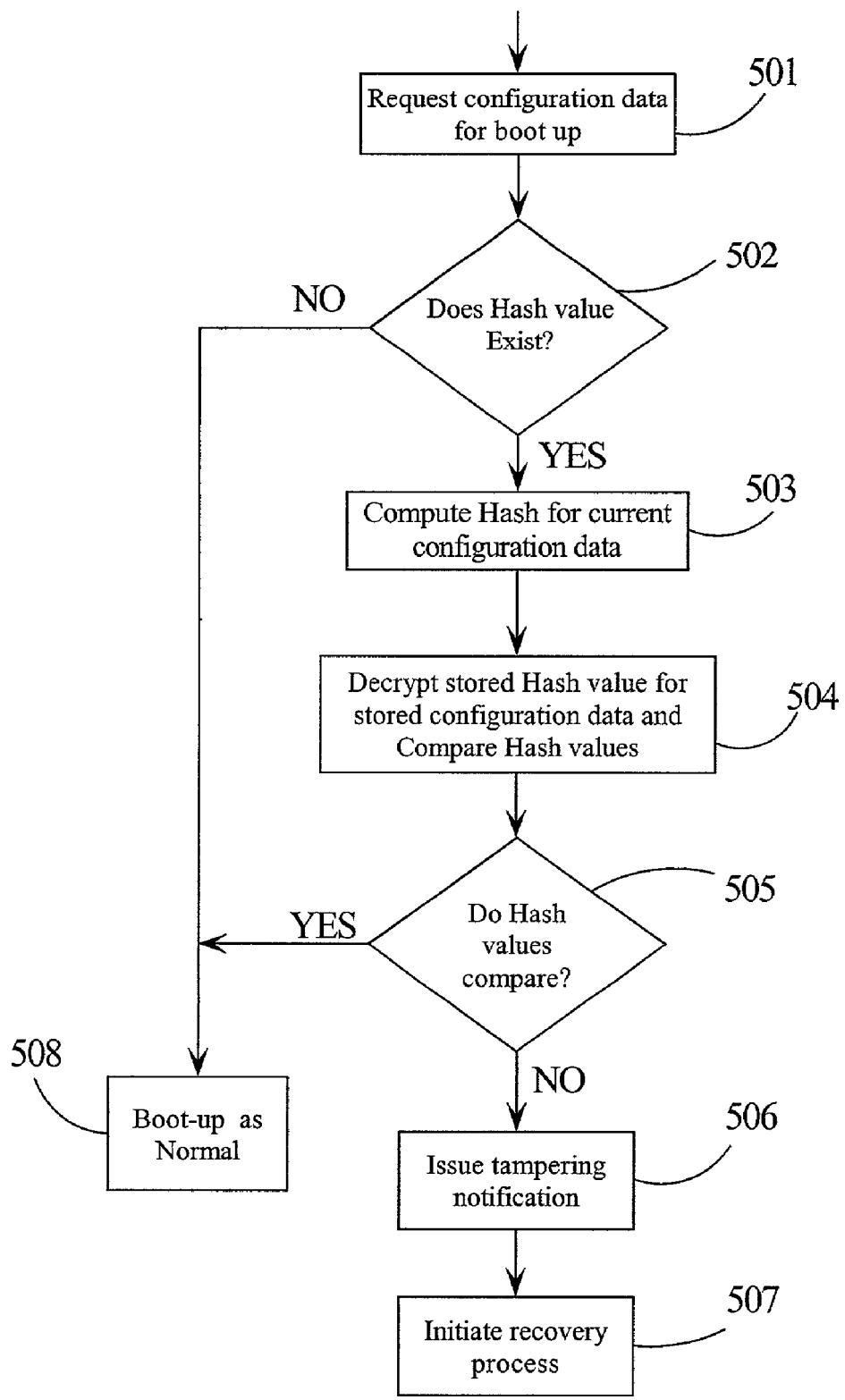
FIG. 5 is a flow diagram of method steps used in embodiments of the present invention.

FIG. 5 is a flow diagram of method steps in embodiments of the present invention when a boot-up request is made in a system 100 which employed extra security according to the method steps in FIG. 4. In step 501, configuration data is requested during boot-up. In step 502, a test is done to determine if a Hash value exists in EEPROM 110. If the result of the test in step 502 is NO, then in step 508 boot-up proceeds as normal since additional security for system 100 has not been requested. If the result of the test in step 502 is YES, then in step 503 a Hash value for the current configuration is computed. In step 504, the stored, encrypted Hash value is decrypted and the two Hash values are compared. In step 505, a test is done to determine if the two Hash values compare. If the result of the test in step 505 is YES, then boot-up proceeds as normal in step 508. If the result of the test in step 505 is NO, then in step 506 a tampering notification is issued indicating that the configuration data has been compromised. In step 507, a recovery process is then initiated.

Figure 6:
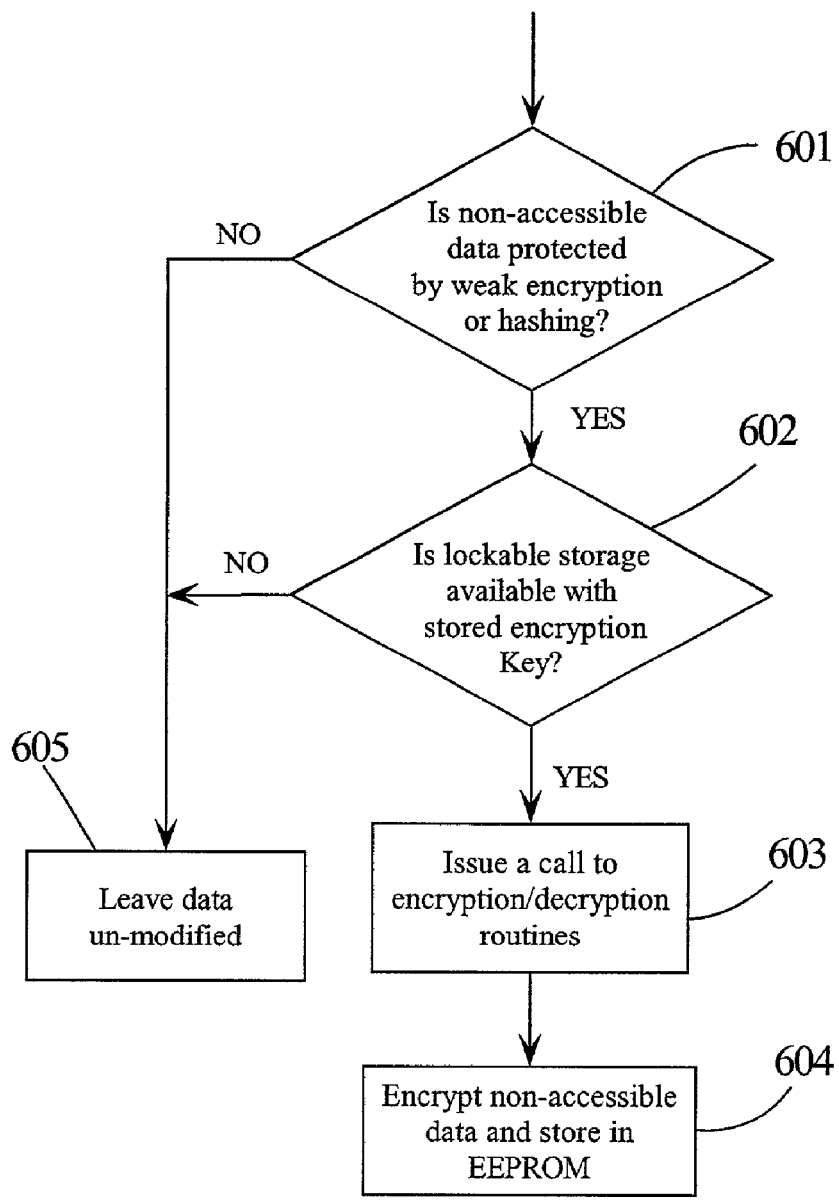
FIG. 6 is a flow diagram of method steps in another embodiment of the present invention.

FIG. 6 is a flow diagram of method steps used in embodiments of the present invention. In step 601, a test is done to determine if unaccessible data is protected by weak encryption or Hashing. If the result of the test in step 601 is NO, then the unaccessible data is left unmodified in step 605. If the result of the test in step 601 is YES, then in step 602 a test is done to determine if protected storage is available with a stored symmetrical encryption Key. If the result of the test in step 602 is NO, then the unaccessible data is left unmodified in step 605. If the result of the test in step 602 is YES, then in step 603 a call is issued to encryption/decryption routines in the BIOS code. In step 604, the unaccessible data is encrypted and stored in the EEPROM 110.

Figure 3:
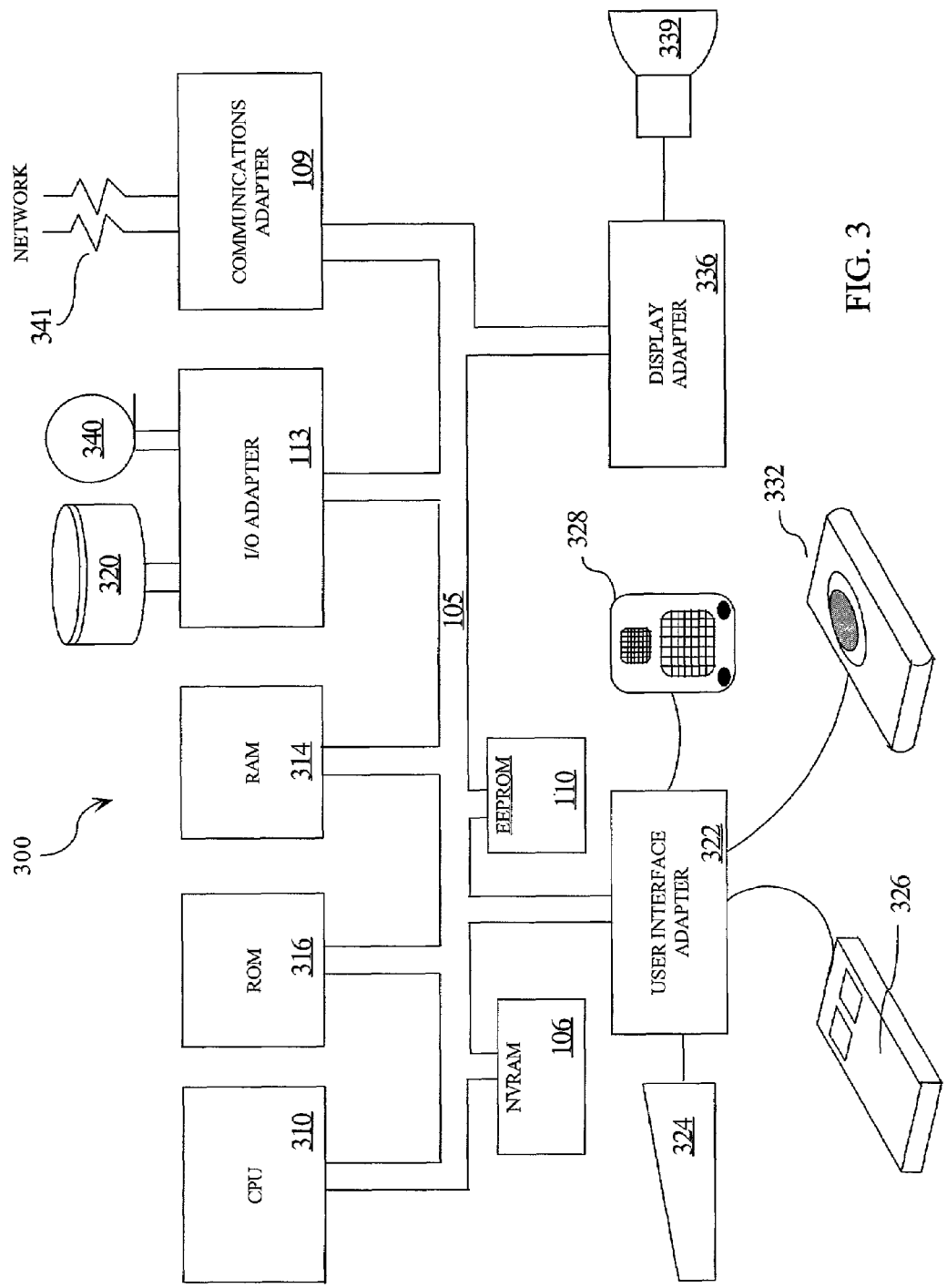
FIG. 3 is a block diagram of a system configured to use embodiments of the present invention.

FIG. 3 is a high level functional block diagram of a representative data processing system 300 suitable for practicing the principles of the present invention. Data processing system 300 includes a central processing system (CPU) 310 operating in conjunction with a system bus 105. System bus 105 operates in accordance with a standard bus protocol compatible with CPU 310. CPU 310 operates in conjunction with an electronically erasable programmable read-only memory (EEPROM) 110, non-volatile random access memory (NVRAM) 106 and random access memory (RAM) 314. Among other things, EEPROM 110 supports storage of the Basic Input Output System (BIOS) code 112 and Boot block code 111. RAM 314 includes DRAM (Dynamic Random Access Memory) system memory and SRAM (Static Random Access Memory) external cache. I/O Adapter 113 allows for an interconnection between the devices on system bus 105 and external peripherals, such as mass storage devices (e.g., an IDE hard drive, floppy drive or CD/ROM drive), or a printer 340. A peripheral device 320 is, for example, coupled to a peripheral control interface (PCI) bus, and I/O adapter 113 therefore may be a PCI bus bridge. User interface adapter 322 couples various user input devices, such as a keyboard 324, mouse 326, touch pad 332 or speaker 328 to the processing devices on bus 312. Display 339 which may be, for example, a cathode ray tube (CRT), liquid crystal display (LCD) or similar conventional display units. Display adapter 336 may include, among other things, a conventional display controller and frame buffer memory. Data processing system 300 may be selectively coupled to a computer or communications network 341 through communications adapter 109. Communications adapter 109 may include, for example, a modem for connection to a communication network and/or hardware and software for connecting to a computer network such as a local area network (LAN) or a wide area network (WAN). CPU 310 may employ a processor 103 executing some software program employing method steps according to embodiments of the present invention. EEPROM 110 may be accessible from an external device (e.g., 320) via I/O adapter 113 or communications adapter 109 according to embodiments of the present invention.

Although the present invention and its advantages have been described in detail, it should be understood that various changes, substitutions and alterations can be made herein without departing from the spirit and scope of the invention as defined by the appended claims.

What is claimed is:

1. A method for securing alterable data in a remotely managed system comprising the steps of:
    providing protected storage accessible by Basic Input Output System (BIOS) code;
    storing a symmetrical encryption Key in said protected storage;
    encrypting normally unaccessible (NA) data with said symmetrical encryption Key; and
    storing said encrypted NA data and accessible non-encrypted (ANE) data in an unprotected lockable persistent storage with existing write protect algorithms.

2. The method of claim 1 further comprising the steps of:
    altering said ANE data by issuing an existing write request to said BIOS from said write protect algorithms for said unprotected lockable persistent storage; and
    updating said ANE data in said unprotected lockable persistent storage.

3. The method of claim 1 further comprising the steps of:
    accessing said NA data via a change request issued to said BIOS over a secure communication link;
    validating said change request;
    retrieving said symmetrical encryption Key by said BIOS in response to said validated change request;
    using said symmetrical encryption Key to decrypt and alter said NA data;
    encrypting said altered NA data using said symmetrical encryption Key; and
    storing said altered encrypted NA data in said unprotected lockable persistent storage.

4. The method of claim 1 further comprising the steps of:
    hashing said ANE data and encrypting said Hash with said symmetrical encryption Key;
    storing said encrypted Hash with said ANE data;
    computing a Hash of configuration data in said ANE data on a boot-up request;
    decrypting said stored encrypted Hash of said configuration data;
    comparing said decrypted Hash of said stored configuration data to said computed Hash of said configuration data from said ANE data;
    booting normally in response to a compare of said decrypted Hash and said computed hash; and
    issuing tamper notification and initiating recovery processes on a non-compare of said decrypted Hash and said computed hash.

5. A computer program product for securing alterable data in a remotely managed system with minimal secure storage, said computer program product embodied in a machine readable medium, including programming for a processor, said computer program comprising a program of instructions for performing the program steps of:
    providing protected storage accessible by Basic Input Output System (BIOS) code;
    storing a symmetrical encryption Key in said protected storage;
    encrypting normally unaccessible (NA) data with said symmetrical encryption Key; and
    storing said encrypted NA data and accessible non-encrypted (ANE) data in an unprotected lockable persistent storage with existing write protect algorithms.

6. The computer program product of claim 5 further comprising the program steps of:
    altering said ANE data by issuing an existing write request to said BIOS from said write protect algorithms for said unprotected lockable persistent storage; and
    updating said ANE data in said EFPROM unprotected lockable persistent storage.

7. The computer program product of claim 5 further comprising the program steps of:
    accessing said NA data via a change request issued to said BIOS over a secure communication link;
    validating said change request;
    retrieving said symmetrical encryption Key by said BIOS in response to said validated change request;
    using said symmetrical encryption Key to decrypt and alter said NA data;
    encrypting said altered NA data using said symmetrical encryption Key; and
    storing said altered encrypted NA data in said unprotected lockable persistent storage.

8. The computer program product of claim 5 further comprising the program steps of:
    hashing said ANE data and encrypting said Hash with said symmetrical encryption Key;
    storing said encrypted Hash with said ANE data;
    computing a Hash of configuration data in said ANE data on a boot-up request;
    decrypting said stored encrypted Hash of said configuration data;
    comparing said decrypted Hash of said stored configuration data to said computed Hash of said configuration data from said ANE data;
    booting normally in response to a compare of said decrypted Hash and said computed hash; and
    issuing tamper notification and initiating recovery processes on a non-compare of said decrypted Hash and said computed hash.

9. A computer system comprising:
    a central processing unit (CPU);
    a random access memory (RAM);
    a non-protected lockable persistent storage;
    an I/O adapter; and a bus system coupling said CPU to said non-protected lockable persistent storage, said I/O adapter, and said RAM, wherein said CPU further comprises:

protected storage accessible by Basic Input Output System (BIOS) code;

circuitry for storing said symmetrical encryption Key in a protected storage;

circuitry for encrypting normally unaccessible (NA) data with said symmetrical encryption key; and circuitry for storing said encrypted NA data and accessible non-encrypted (ANE) data in said non-protected lockable persistent storage with existing write protect algorithms.

10. The data processing system of claim 9 further comprising:

circuitry for altering said ANE data by issuing an existing write request to said BIOS from said write protect algorithms for said non-protected lockable persistent storage; and circuitry for updating said ANE data in said non-protected lockable persistent storage.

11. The data processing system of claim 9 further comprising:

circuitry for accessing said NA data via a change request issued to said BIOS over a secure communication link;

circuitry for validating said change request;

circuitry for retrieving said symmetrical encryption Key by said BIOS in response to said validated change request;

circuitry for decrypting and altering said NA data said using said symmetrical encryption Key;

circuitry for encrypting said altered NA data using said symmetrical encryption Key; and circuitry for storing said altered encrypted NA data in said non-protected lockable persistent storage.

12. The data processing system of claim 9 further comprising:

circuitry for hashing said ANE data and encrypting said Hash with said symmetrical encryption Key;

circuitry for storing said encrypted Hash with said ANE data;

circuitry for computing a Hash of configuration data in said ANE data on a boot-up request;

circuitry for decrypting said stored encrypted Hash of said configuration data;

circuitry for comparing said decrypted Hash of said stored configuration data to said computed Hash of said configuration data from said ANE data;

circuitry for booting normally in response to a compare of said decrypted Hash and said computed hash; and circuitry for issuing tamper notification and initiating recovery processes on a non-compare of said decrypted Hash and said computed hash.

* * * * *